Oct. 24, 1967 L. M. HARVEY 3,348,459
INTERLOCKING MATTING AND COUPLING BAR THEREFOR
Filed Jan. 3, 1967 3 Sheets-Sheet 1

INVENTOR.
LEO M. HARVEY
BY Donald Townsend
Atty.

Oct. 24, 1967            L. M. HARVEY            3,348,459

INTERLOCKING MATTING AND COUPLING BAR THEREFOR

Filed Jan. 3, 1967                                3 Sheets-Sheet 3

INVENTOR.
LEO M. HARVEY
BY Donald Townsend
Atty.

United States Patent Office 3,348,459
Patented Oct. 24, 1967

3,348,459
INTERLOCKING MATTING AND COUPLING
BAR THEREFOR
Leo M. Harvey, Los Angeles, Calif., assignor to
Harvey Aluminum (Incorporated)
Filed Jan. 3, 1967, Ser. No. 606,767
6 Claims. (Cl. 94—13)

ABSTRACT OF THE DISCLOSURE

This invention relates to extruded structural metal units having deck and base plates spaced by means of parallel ribs which can be detachably interlocked to form deck or surface matting for roadways or airfields. Formed during the extrusion of the mat are male connector means on one side edge of the mat and complementary female connector means on the other side edge. The end connector means of the present invention are formed by cutting away ends of the ribs and side edge connectors between the plates and then bending the end of each plate inwardly toward the other plate to form socket-like end connector means into which a coupling bar can be inserted in keying engagement.

---

In the detachable interlocking matting employed heretofore, preformed complementary male and female connectors are welded across opposite ends of each structural unit (see U.S. Patent No. 3,172,508). Because of the normally high impact loads applied to these end connectors, they are necessarily of relatively heavy construction and often more rigid than the body of the mat. Where langing aircraft touch down at or near the end of a plank and/or landing occurs on a section of matting overlying soil sufficiently unstable to support the load, greater elastic deformation can occur in the body of the mat than in the rigid end connector with the development of a shear stress across the weld. With matting in service, the shear stress developed often causes failure of the weld as well as damage to the end of the plank, the exposed sharp or ragged edges of the matting being extremely hazardous to other landing aircraft. To avoid a tire puncture or other mishap, runway matting must consequently be inspected frequently and damaged matting sections either rewelded or entirely replaced.

It is, therefore, a principal object of the invention to provide an improved and more reliable matting assembled from a plurality of structural units having integrally formed end connectors;

Another object is to provide for use on both ends of a a matting section a novel end connector and method of forming same thereon without welding;

Yet another object is to provide an improved coupling bar for use in combination with the connector means to form an articulating joint between matting sections;

Still another object is to provide a durable high-strength airfield matting having between matting sections an improved articulating joint capable of sustaining high impact loads without failure.

These and other objects and advantages of the invention will become apparent upon reference to the following description, drawings, and claims appended hereto.

To attain the foregoing objects, an elongated structural mat section having a base element and a spaced parallel deck element supported by columnar means is provided with end connector means formed integral with an end of at least one of said elements and extending outwardly beyond the columnar means. The end connector means are disposed intermediate side edges of the unit and comprise a flange extending transversely of the plane of the element from which it projects. Preferably, end connector means are provided on opposite ends of the unit, with first and second flanges formed integral with an upper deck plate element and a lower base plate element, respectively, each of the flanges having a marginal edge portion extending laterally beyond the columnar means in the plane of the element from which it projects and an inwardly turned end portion extending intermediate the plate elements.

To assemble the matting, a coupling member is removably inserted in the end connector means and the inwardly turned end portions of the flanges extend into grooves formed in the coupling bar. In a preferred embodiment, the end portion of the flange is arcuate and projects into and around a projection, such as a lobe, extending inwardly from a wall of the groove, a coupling bar fitting loosely in two such end connectors forming an articulating joint free of welds.

The above-described mat sections are preferably provided along their side edges and between the end connectors with a locking means, such as, on one side with a male connecting means and a complementary female connecting means on the other side. Mat sections so formed interlock along all edges with other similar sections, the weld-free resultant high strength matting having articulating joints capable of sustaining high impact loads without failure.

The invention will be more fully understood from the following detailed description of preferred embodiments illustrated in the drawing, in which.

Figure 1:
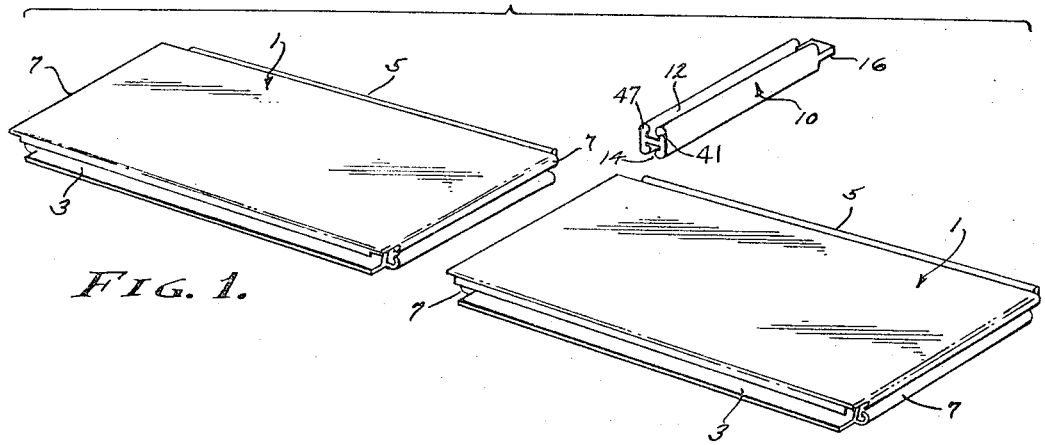
FIG. 1 is a perspective view showing the two end-to-end positioned mat sections and a coupling bar to detachably interlock the ends thereof.
Figure 2:
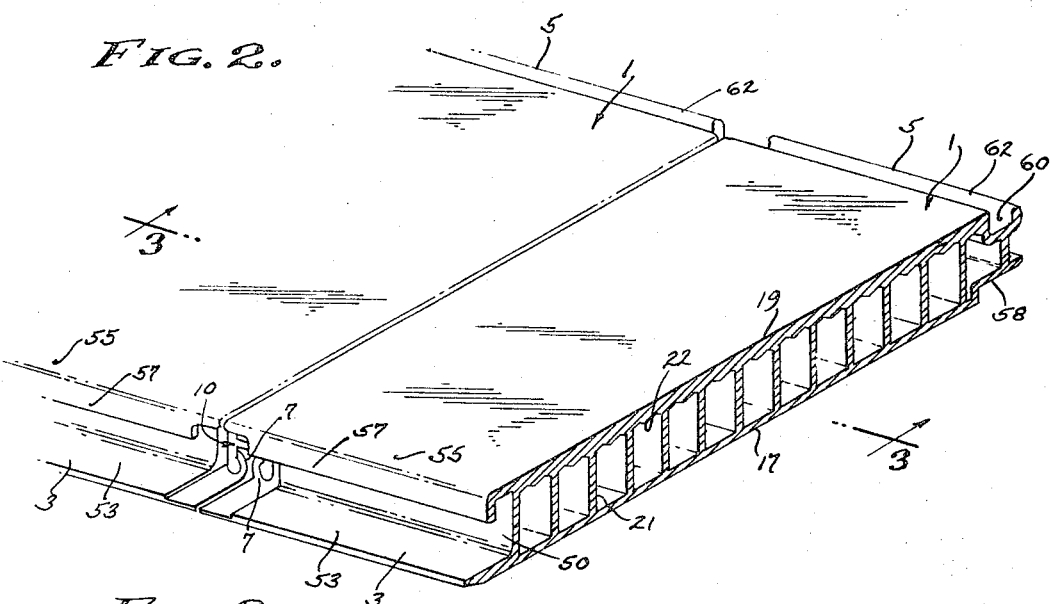
FIG. 2 is a perspective view, broken transversely, illustrating the internal construction of the mat sections and connector means formed integral with ends of two mat sections.

Referring now to the drawings, a pair of mat sections indicated generally at 1, are shown each having male side edge connectors 3, female side edge connectors 5, and end connecting means 7 on both ends thereof (FIG. 1). The coupling bar 10 is provided with a first locking recess 12 and a second locking recess 14 in its upper and lower surfaces, respectively, and a tongue 16 extends from an end thereof to assist in removal of the bar from the connecting means. The body of the plank comprises a planar base plate 17 and a parallel spaced planar deck plate 19 supported by a plurality of longitudinally extending columnar means 21 coextensive therewith (FIG. 2).

Suitable for use as columnar means are, for example, ribs or webs disposed vertically and/or diagonally vertically at spaced intervals to form a tubular or cellular type of structural unit. When the matting is to be used in surfacing an airfield (sustaining high impact loads), the deck plate is preferably strengthened by providing a deepened or thickened portion midway between each rib where maximum bending stress occurs. The span of the deck between supporting ribs 21 thus varies in thickness, being of substantial thickness at 22 and then tapering to nominal thickness at the filletted joinder with the spaced webs.

Figure 4:
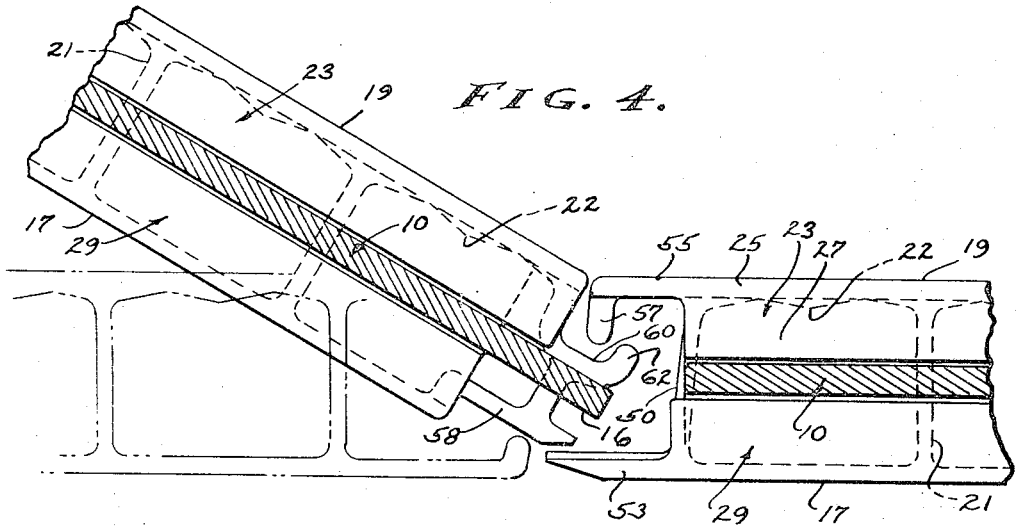
FIG. 4 is an elevational view, in section, showing the method of interlocking the preferred male and female side edge connectors.

Although any of the conventional side edge connectors can be used, it is preferred to employ a male connector 3 on one side edge and a complementary female connector 5 on the other side, the male connector comprising a longitudinally extending wall 50, a flange 53 integral with and extending laterally from the base 17, and an upper flange 55 formed integral with and extending laterally from deck 19 with a downwardly turned depending portion 57. The complementary female edge connector comprises a downwardly faced shoulder 58 recessed upwardly from the lower base surface to receive flange 53, and an upwardly open channel 60 recessed below the deck surface to receive downwardly depending flange 57 which can be interlocked against transverse movement in the channel by an upwardly projecting flange 62 (FIGS. 2 and 4). It can be seen that, with one mat section disposed horizontally with the male edge connector exposed, the female connector of the next unit can be pivotally hooked into the male edge, using a counterclockwise pivotal motion in laying mat sections to the left of center, and a clockwise pivotal motion in laying mat sections to the right of center.

Figure 3:
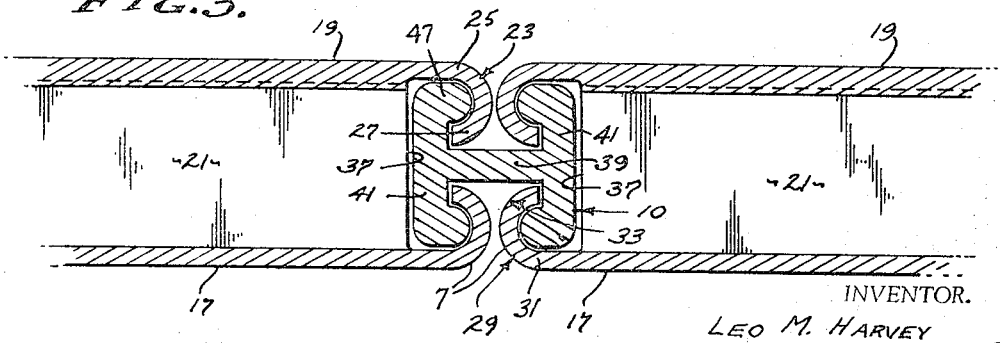
FIG. 3 is an elevational view, in section, taken along line 3—3 of FIG. 2, illustrating the joint formed by the insertion of a coupling bar into adjacent end connectors.

In accordance with the invention, end connector means are formed on opposite ends of each mat section, a coupling bar being removably inserted therein to link the ends of the planks. The connector means 7 extends outwardly beyond the ribs and comprises a first flange indicated generally at 23 having a marginal edge portion 25 formed integral with and projecting laterally from the deck plate and a downwardly turned end portion 27 extending transverse to the plane of the deck. In a preferred embodiment, a second flange 29 is optionally provided with a marginal edge portion 31 formed integral with and projecting laterally from the base and an upwardly projecting end portion 33. Into the open-sided recess defined by first and second flanges 23 and 29, respectively, and the end 37 of the ribs is inserted an H-shaped coupling bar 10 having a cross member 39 and a pair of parallel spaced vertical wall 41 (FIG. 3). The two walls 41 extending above and below the cross member 39 define upper locking recess or groove 12 for receiving the first flange and a lower locking recess or groove 14 adapted to receive the second flange.

In the preferred embodiment shown in FIGS. 1 to 3, inclusive, arcuate end portions 27 and 33 of the first and second flanges 23 and 29, respectively, extend inwardly into grooves 12, 14 and around lobes 47 projecting inwardly from the walls of the grooves. Satisfactory interlocking is also achieved by using a lug or any other shape of projection on the walls of the groove. For example, the projection can advantageously extend from a vertical wall 41 into the groove with an end portion turned inwardy toward the cross bar, the end portion of the flange extending around and under the projection to completely envelope same. The end portion of the flange advantageously conforms in contour to the wall of the groove in the coupling bar, projections extending from the wall preferably being embraced by the flange.

To secure the ends of the planks together and form an articulating joint therebetween, the coupling bar 10 is merely removably inserted into and through the horizontally extending slot formed by the end-to-end positioned connector means (FIG. 2).

The above-described end connectors and coupling bar can advantageously also be employed to detachably interlock the side of the plank, although it is preferred to employ the male connectors on one side edge and a complementary female connector on the other side edge.

The matting of the present invention can be fabricated in any conventional manner, although it is preferred to extrude the body of the mat along its longitudinal axis. In matting extruded, for example, from aluminum and the alloys thereof, the deck plate, base plate, reinforcing ribs therebetween, and the male and complementary female side edge connectors are preferably all formed in a single extrusion step resulting in a high strength unitary structure. Mat sections so produced are then preferably heat treated, stretched, roll flattened, sawed or cut to length, and then aged for from 6 to 10 hours at 365 to 380° F.

Figure 5:
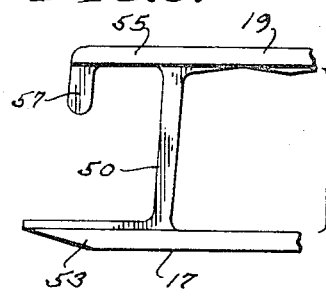
FIG. 5 is an elevational view, in section, of an end portion of a mat section before an end connector is formed thereon.
Figure 6:
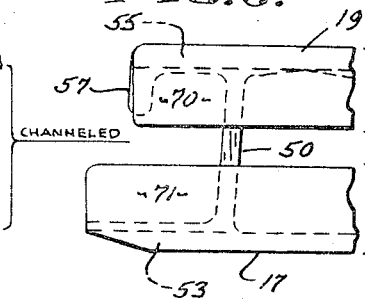
FIG. 6 is an elevational view, in section, of the end portion of the mat in FIG. 5 during the construction of the end connector thereon.
Figure 7:
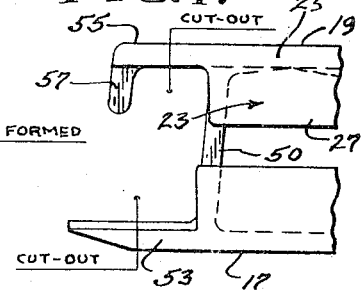
FIG. 7 is an elevational view, in section, of the end portion of the mat section of FIG. 5 with the end connector completely formed thereon.
Figures 8, 9:
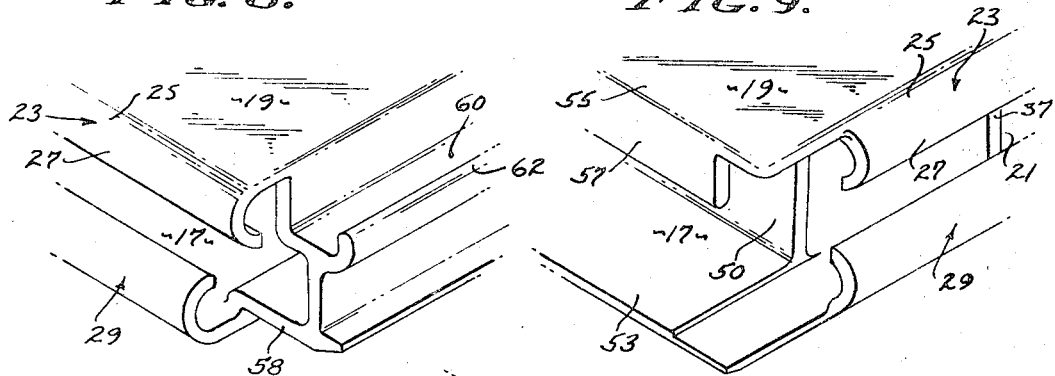
FIG. 8 is a perspective view, in section, showing the juncture between the end connector and the female side connector.
FIG. 9 is a perspective view, in section, of the juncture between the end connector and male side connector.
Figure 10:
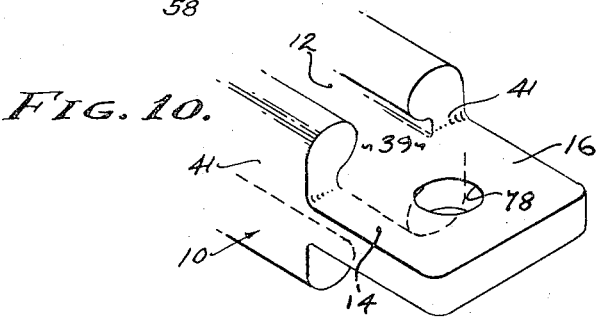
FIG. 10 is a perspective end view, in section, of the interlocking coupling bar.

The end connector can then advantageously be formed on the end of the individual mat section by removing an end portion of the ribs and side edge connectors as well as any thickened portion of the deck plate (as shown in dotted lines FIGS. 5, 6, 7), flanges integral with and projecting laterally from the deck and base plates being formed. Thereafter, an end portion of the resultant laterally projecting flange is bent or otherwise turned inwardly intermediate the plates. To facilitate interlocking of the side edge connectors and insertion of the coupling bar into the channeled end portion of the section shown in dotted lines (FIG. 6), it is necessary to also remove or cut out corner portions 70, 71 of the resultant formed flange extending beyond wall 50 (FIG. 7), the juncture formed between the end connector and male and female side edge connectors being illustrated in FIGS. 8 and 9.

When the interlocked matting having an end portion of the female side connector removed is in tension, the corners of the sections can be spaced apart leaving an aperture therebetween through which underlying soil can extrude. Because the deck surface is desirably maintained free of pebbles or soil, an end of the coupling bar is preferably provided with a projecting tongue 16 which in operative position overlies the opening at the corners of the matting. The projecting tongue 16 is preferably provided with an aperture or hole 78 into which a hook can be inserted for easy removal of the bar from the end connector.

Figure 11:
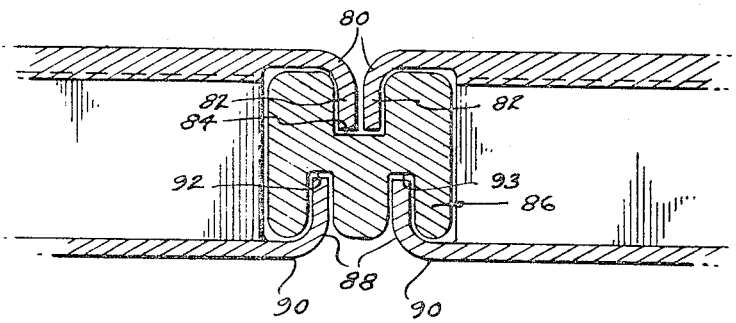
FIG. 11 is an elevational view, in section, of one preferred form of connecting means and compatible coupling bar.

In another preferred embodiment, the end portions 82 of adjacent first deck flanges 80 project downwardly into a single groove 84 formed in an upper surface of coupling bar 86, and upwardly projecting end portions 88 of second base flanges 90 extend into separate grooves 92, 93 (FIG. 11). Alternatively, the arrangement of the flanges can also be reversed with the upper flanges of adjacent end connectors projecting into separate spaced grooves in the coupling bar.

Figure 12:
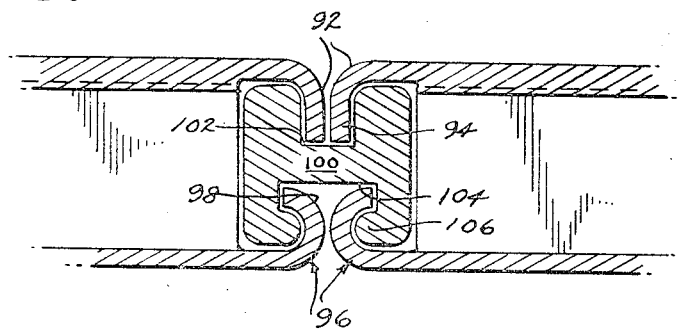
FIG. 12 is an elevational view, in section, of another preferred form of connecting means and compatible coupling bar.

Another preferred embodiment employs an end connector with a first flange 92 integral with the deck plate and having an end portion 94 turned normal thereto, and a second flange 96 projecting from base plate and having an inwardly turned arcuate end portion 98 (FIG. 12). The coupling bar 100 for use therewith is provided on its upper face with a recess 102 having substantially vertical walls, and in its lower face with a recess 104 having lobes 106 extending inwardly from the walls thereof to seat in the arcuate recess formed by the end portions of the flanges.

Figure 13:
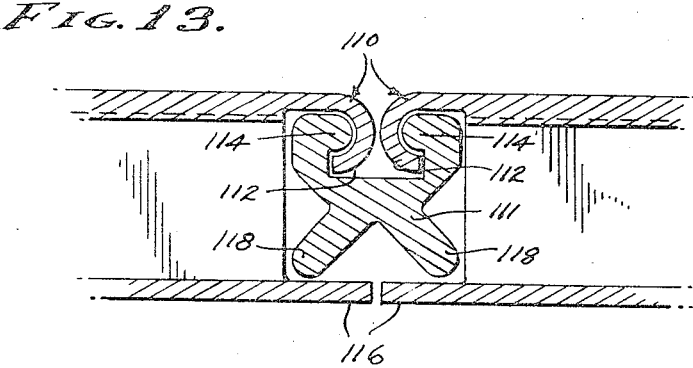
FIG. 13 is an elevational view, in section, of still another preferred form of connecting means and coupling bar therefor.

In still another preferred embodiment (FIG. 13), the first flanges 110 extending from the deck plate form an arcuate hook 112 which grasps lobes 114 on coupling bar 111 as in FIG. 3. The flanges 116 formed integral with the deck plate extend laterally therefrom and lack an inwardly turned end portion, coupling bar 111 being supported within the end connectors by downwardly projecting bars 118.

From the foregoing it can be seen that the entire mat section can be manufactured from an integral extrusion without the need for welding, the end connectors thereon being formed by merely cutting away ends of the ribs and side edge connectors and bending an end portion of the resultant flange. End connectors thus formed provide between the ends of mat sections an articulating joint capable of sustaining repeated high impact loads without failure.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What I claim is:

1. An extruded supporting mat section comprising: deck and base plates spaced by means of parallel ribs; male connector means on one side edge of the mat and complementary female connector means on the other side edge; said ribs and the side edge connector means between the plates being cut-away at their ends with ends of the plates extending therebeyond; the end of each plate being turned inwardly toward the other plate to form socket-like end connector means into which a coupling bar can be inserted in keying engagement; the cut-away distance of said ribs and side edge connector means being sufficient to permit sliding of a coupling bar through the end connector means; said deck and base plates, side edge connector means and end connector means all being integral parts of the extrusion.

2. The mat section as defined by claim 1, wherein the mat section is extruded from aluminum.

3. In combination, the mat section of claim 1 and a coupling bar adapted to couple adjacent mat sections, said coupling bar being provided with upper and lower locking recesses defined by walls extending above and below a cross member of the coupling bar, one of said walls being slidably received in one of said socket-like end connectors.

4. The mat section of claim 3, wherein the inwardly turned plates of said end connector means is arcuate and extends around a lug projecting inwardly from said wall of the coupling bar.

5. A matting of at least two end-to-end positioned mat sections as defined by claim 3, wherein the end connector means of each adjacent mat section extends around a portion of the coupling bar, thereby to form an articulating joint between the ends of the mat sections.

6. In combination, a horizontally disposed extruded mat section for detachable interlocking with other similar mat sections and a coupling bar therefor;

said mat section having deck and base plates spaced by means of parallel ribs, male connector means on one side edge of the mat and complementary female connector means on the other side edge, said ribs and side edge connector means between the plates being cut-away at their ends to leave ends of the plates extending therebeyond; the ends of each plate on both ends of the mat section being bent inwardly toward the other plate to form socket-like end connector means;

and removably inserted into the connector means a loosely fitting coupling bar having a first and second groove formed in an upper and lower surface, respectively, with an inwardly extending end portion of the deck projecting around a lobe extending inwardly from a wall of the first groove, and an inwardly extending end portion of the base projecting around a lobe extending inwardly from the wall of the second groove.

References Cited
UNITED STATES PATENTS

| | | | |
|---|---|---|---|
| 2,534,501 | 12/1950 | Coleman | 52—586 |
| 2,711,231 | 6/1955 | Spangler | 94—13 X |
| 3,172,508 | 3/1965 | Doering et al. | |
| 3,301,147 | 1/1967 | Clayton et al. | 94—13 |

JACOB L. NACKENOFF, *Primary Examiner.*